April 27, 1926.
H. C. MUMMERT
LANDING AND LAUNCHING APPARATUS FOR VEHICLES
Filed July 26, 1924  2 Sheets-Sheet 1
1,582,188
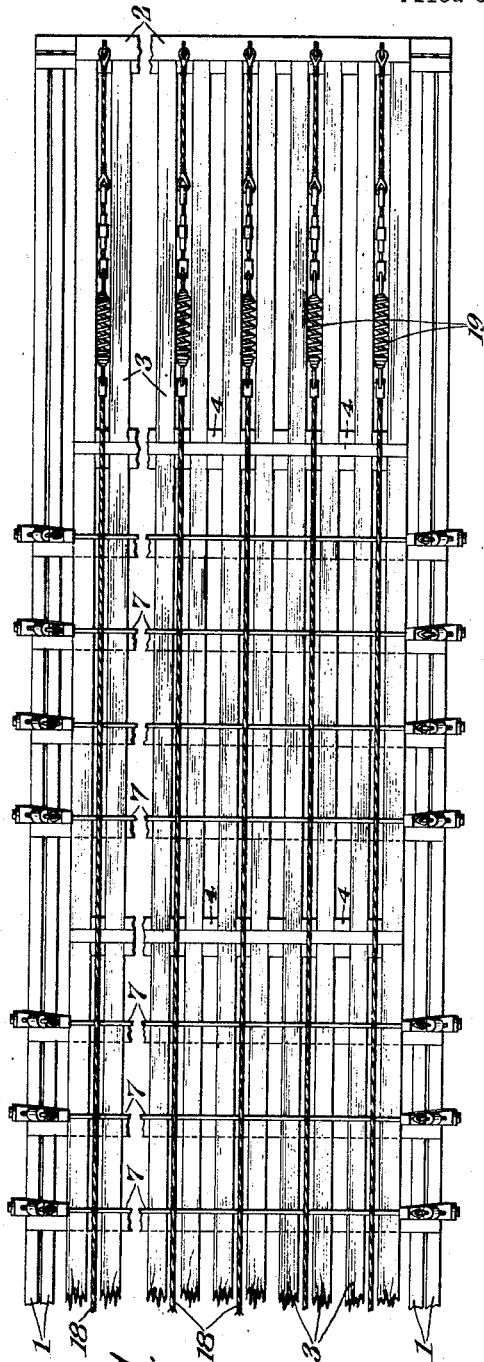
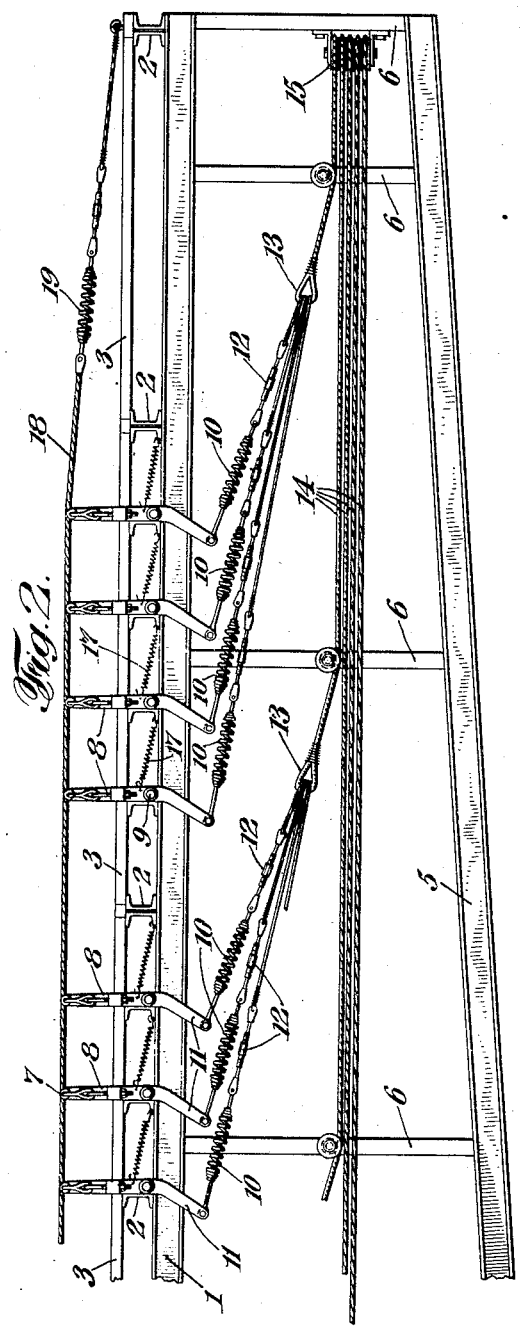
INVENTOR
Harvey C. Mummert
BY
Prindle, Wright, Neal & Bean
ATTORNEYS

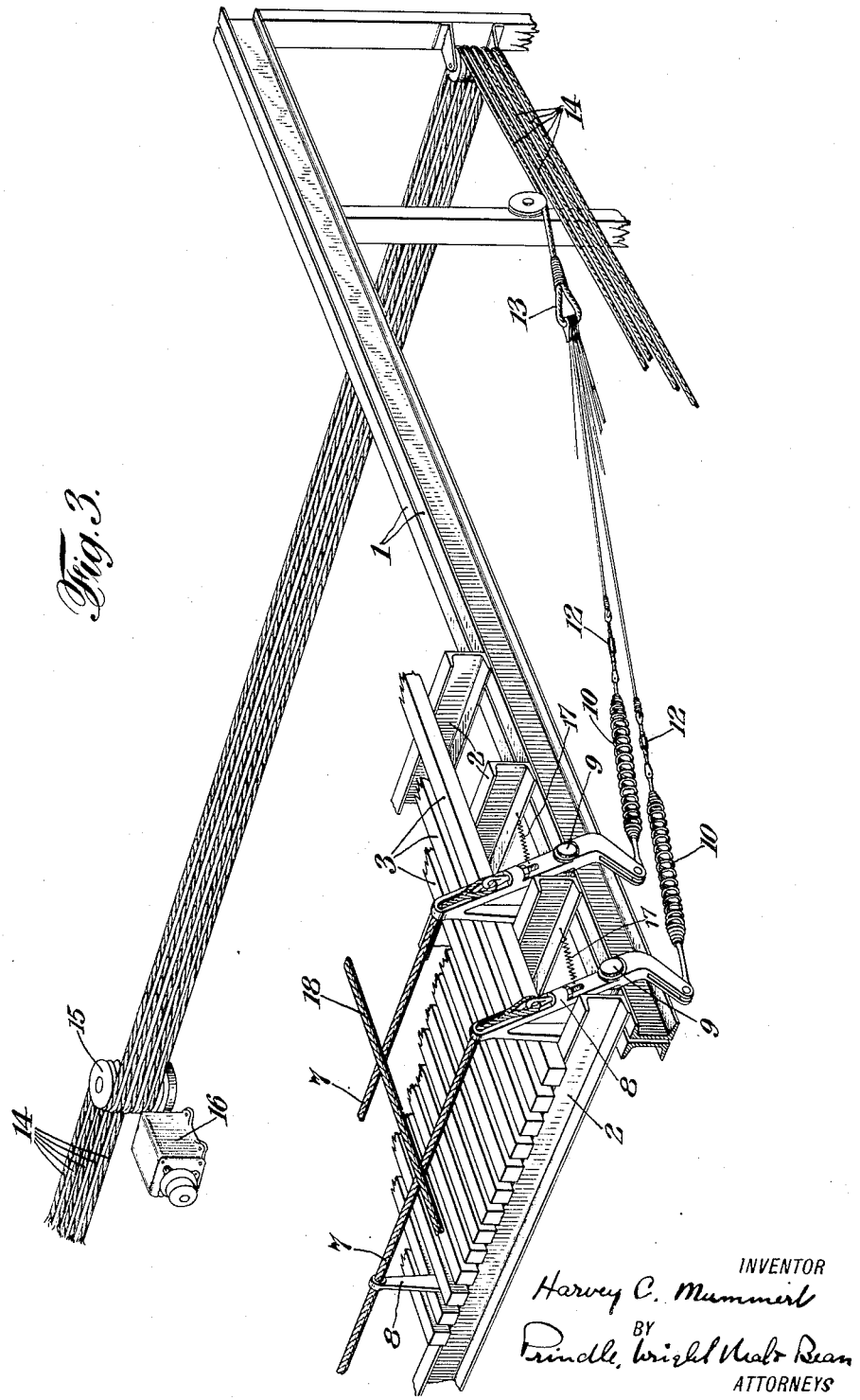

Patented Apr. 27, 1926.

1,582,188

UNITED STATES PATENT OFFICE.

HARVEY C. MUMMERT, OF NEW YORK, N. Y., ASSIGNOR TO MARY A. KENNEY, OF BROOKLYN, NEW YORK.

LANDING AND LAUNCHING APPARATUS FOR VEHICLES.

Application filed July 26, 1924. Serial No. 728,304.

*To all whom it may concern:*

Be it known that I, HARVEY C. MUMMERT, a citizen of the United States, a resident of New York city, in the county of Queens and State of New York, have invented a certain new and useful Landing or Launching Apparatus for Vehicles, of which the following is a specification.

The invention relates to an apparatus for landing aeroplanes or similar aerial vehicles within limited spaces, the apparatus being provided with certain devices, hereinafter explained in greater detail, for the purpose of quickly retarding the travel of the vehicle.

One object of the invention is to provide an apparatus of the above nature which may be quickly adjusted to land vehicles of different sizes and weights.

The invention also includes certain features which are preferably (although not necessarily) employed with an apparatus of the above character whereby the devices used to assist in landing the vehicle may be readily adjusted so as not to interfere with the launching of a vehicle from the same apparatus.

Further objects and advantages of the invention will be in part obvious, and in part specifically pointed out in the dscription hereinafter contained, which, taken in connection with the accompanying drawings, discloses a preferred embodiment thereof. Such embodiment, however, is to be considered as merely illustrative of its principles.

In the drawings,—

Fig. 1 is a plan view, with certain parts broken away, of an apparatus constructed in accordance with the invention;

Fig. 2 is a front elevation of the apparatus shown in Fig. 1; and

Fig. 3 is a perspective view of such apparatus, with certain parts removed for clearness.

The apparatus comprises a suitable platform providing a runway along which the vehicle to be landed or launched may travel, the illustrated form of platform having longitudinal supporting beams on which are carried suitable cross beams 2 which support the floor of the runway. In the present instance this floor is made up of a plurality of longitudinal slats 3 which rest on the cross beams 2 and are slightly spaced by blocks 4 which are interposed between the same, thus providing a gridlike structure through which air may be withdrawn or blown in when a vehicle is to be landed or launched, if desired. The illustrated platform is of a bridgelike construction, having longitudinal girders 5 and uprights 6 located beneath the parts above described. However, as the detailed construction of the platform is not essential to the present invention, the same will not be more specifically described herein.

To assist in checking the speed of a vehicle to be landed I provide above the surface of the runway a plurality of stop members 7 which normally obstruct the travel of the vehicle and are urged toward obstructing position; thus as the vehicle moves along its speed is checked by an amount corresponding to the force necessary to push the successive stop members out of the way. In the present embodiment of the invention the stop members 7 consist of transverse rods or cables which are supported by arms 8 pivoted on spindles 9 near the surface of the runway. The arms 8 are yieldingly urged to hold the stop members 7 in elevated position, as by means of suitable coil springs 10, which pull against the lower ends 11 of arms 8. As shown, the arms 8 are located respectively adjacent the cross beams 2 and bear against the latter when in full elevated position. As the aeroplane moves along the platform from left to right, as shown in Figs. 1 and 2, the successive stop members 7 will be swung down to the level of the platform about the spindles 9 as axes, and the springs 10 will act to oppose the passage of the aeroplane along the platform. The tension of the various springs 10 may be equalized in any suitable manner, as by turnbuckles 12 respectively associated therewith.

According to the present invention the resistance presented to the travel of an aeroplane by the stop members 7 may be adjusted simultaneously by a common device which may be operated to regulate the force tending to maintain each stop member 7 in elevated position. As shown, the springs 10, corresponding to different groups of stop members, are coupled at one end to a loop 13 on each of a series of cables 14, and the tension on the cables is adjustable in any suitable manner as by means of a winding drum 15 (Figs. 2 and 3) at one end of the platform. If a heavy machine is to be landed the drum 15 may be wound up in any suitable manner, as by the motor 16 indicated diagrammatically in Fig. 3, to increase the tension upon the cables 14, thus increasing the resistance which is opposed to the travel of the machine by the stop members 7. However, the proper adjustment of the stop members for a heavy machine might cause undue shocks or strains in landing the lighter or more fragile aeroplane, and with an adjusting device above described the tension of the springs 10 may be readily relieved by unwinding the drum 15 to the proper degree. It will thus be seen that the stop members 7 may be quickly adjusted, according to the weight of the machine which is to be landed.

Preferably the arms 8 are also provided with springs 17, weaker than the springs 10 above mentioned, and tending to swing the stop members 7 down to the level of the platform; thus when the tension on springs 10 is sufficiently released the springs 17 will pull the stop members down onto the platform as might be desirable, for example, in launching, or whenever it is desired that the travel of the machine over the surface of the runway be unimpeded.

In accordance with another aspect of the invention, I may provide a plurality of spaced, longitudinal, guide members 18 above the surface of the runway to assist in landing the machine with the runway when passing thereover, and these guide members also may be dropped to the level of the runway when it is desired to have the passage of the machine thereover unimpeded. As shown, the guide members 18 consist of cables strung form one end of the platform to the other and supported by the stop members 7; thus when the members 7 are dropped to the level of the platform the cables 18 will fall also. Preferably springs 19 are used in connection with the cables, tending to pull them down against the platform as soon as the supports beneath them are removed. It will be obvious that the members 7 may perform their function of acting as removable supports for the guide members 18, regardless of whether such members 7 also act as stops, but although not essential, it is preferred to have the same members perform both functions conjointly, as is the case in the above-described embodiment of the invention.

While a specific embodiment of the invention has been disclosed it will be obvious that many changes may be made therein without departing from its principles as defined in the appended claims.

I claim:

1. In an apparatus for landing or launching vehicles, a runway having stop members mounted above the same in position to engage and retard the motion of a vehicle passing thereover, supporting means for such members permitting the same to move to non-retarding position when engaged by a vehicle, means yieldingly urging said members toward their vehicle-retarding position, and devices for adjusting the amount of force applied to said members by said last-mentioned means.

2. In an apparatus for landing or launching vehicles, a runway having transverse stop members mounted above the same in position to engage and to retard the motion of a vehicle passing thereover, supporting means for such members permitting the same to assume elevated and depressed positions, springs yieldably urging said members toward their elevated position, and a common means for adjusting the tension of a plurality of said springs.

3. In an apparatus for landing or launching vehicles, a runway, transverse stop members, pivoted arms normally supporting said stop members in position above said runway, springs connected to said arms and urging said stop members toward elevated position, and a common adjustable device for simultaneously adjusting the tension of a plurality of said springs.

4. In an apparatus for landing or launching vehicles, a runway having stop members mounted above the same in position to engage and retard the motion of the vehicle passing thereover, supporting means for said members permitting the same to move to a non-retarding position when engaged by a vehicle, means yieldingly urging said members toward their vehicle-retarding position, and means for releasing said last-mentioned means to permit said members to move to, and remain in, non-retarding position.

5. In an apparatus for landing or launching vehicles, a runway, spaced substantially parallel guide members extending along the same, supporting means for said guide members normally maintaining the same in position above said runway, and means for adjusting said supporting devices to permit said guide members to drop substantially to the surface of the runway.

6. In an apparatus for landing or launching vehicles, a runway, spaced substantially parallel guide members extending along the same, means yieldingly urging said guide members toward the surface of the runway, and supporting members normally maintaining said guide members in position above said runway, and means for adjusting said supporting members to permit said first-mentioned means to draw the guide members down onto the runway.

7. In an apparatus for landing or launching vehicles, a runway, spaced substantially parallel guide members extending along the same, transverse stop members disposed across the runway beneath said guide members, supporting means for said stop members permitting the same to assume elevated and depressed positions, and means yieldingly urging said stop members toward their elevated positions, said stop members supporting said guide members.

8. In an apparatus for landing or launching vehicles, a runway, spaced substantially parallel guide members extending along the same, transverse stop members disposed across the runway beneath said guide members, supporting means for said stop members permitting the same to assume elevated and depressed positions, means yieldingly urging said stop members toward their elevated positions, said stop members supporting said guide members, and means for adjusting said supporting members to permit the stop members and guide members to drop substantially to the surface of the runway.

In testimony that I claim the foregoing, I have hereunto set my hand this 9th day of July, 1924.

HARVEY C. MUMMERT.